United States Patent [19]
Ginzboorg et al.

[11] Patent Number: 5,881,137
[45] Date of Patent: Mar. 9, 1999

[54] TRAFFIC CONTROL IN A TELECOMMUNICATIONS SYSTEM

[75] Inventors: Philip Ginzboorg, Helsinki; Timo Kauhanen, Kirkkonummi; Mikko Olkkonen; Richard Fehlmann, both of Helsinki, all of Finland

[73] Assignee: Nokia Telecommunications, Espoo, Finland

[21] Appl. No.: 860,172

[22] PCT Filed: Dec. 13, 1995

[86] PCT No.: PCT/FI95/00679

§ 371 Date: Jun. 16, 1997

§ 102(e) Date: Jun. 16, 1997

[87] PCT Pub. No.: WO96/19070

PCT Pub. Date: Jun. 20, 1996

[30] Foreign Application Priority Data

Dec. 16, 1994 [FI] Finland .................................. 945944

[51] Int. Cl.⁶ ............................................ H04M 15/00
[52] U.S. Cl. ..................... 379/113; 379/139; 379/134; 370/234
[58] Field of Search ..................... 379/113, 112, 379/134, 137, 138, 139, 219, 220, 196, 197; 370/232, 234, 230; 395/200.65

[56] References Cited

U.S. PATENT DOCUMENTS 3,796,837  3/1974  Mathews .
4,224,479  9/1980  Crawford .
5,060,258  10/1991 Turner ...................................... 379/134
5,295,183  3/1994  Langlois et al. .
5,359,649  10/1994 Rosu et al. ............................... 379/113
5,500,889  3/1996  Baker et al. ............................. 379/112

FOREIGN PATENT DOCUMENTS 176 764  4/1986  European Pat. Off. .

OTHER PUBLICATIONS

Turner et al: "A New Call Gapping Algorithm for Network Traffic Management"; Proc of the 13th Teletraffic Congress, 19–26 Jun. 1991, pp. 121–126, see the whole document.
Amano: Patent Abstracts of Japan, vol. 16, No. 303, E–1228, abstract of JP, A,4–82436, Mar. 16, 1992.
Nakajima: Patent Abstracts of Japan, vol. 14, No. 89, E–891, abstract of JP, A,1–297955, Dec. 1, 1989.
"Series E: Telephone Network and ISDN", International Telecommunication Union, Recommendation E.412, Oct. 1996.
"Digital Exchanges", International Telecommunication Union, Recommendation Q.542, Mar./1993.

*Primary Examiner*—Paul Loomis
*Attorney, Agent, or Firm*—Pillsbury Madison & Sutro LLP

[57] ABSTRACT

The invention relates to a method and gate arrangement for controlling traffic in a telecommunications system. The rate of occurrence of the units, such as calls, transmitted is restricted to a certain predetermined threshold value when their rate of occurrence exceeds the value. In order that it might be possible to better approximate an ideally operating gapping gate, when a new call arrives, an average value of the interval between two consecutive calls is computed on the basis of the earlier accepted calls only, and the call is accepted, if the average value computed is at least the same as the predetermined threshold value.

9 Claims, 4 Drawing Sheets

TRAFFIC CONTROL IN A TELECOMMUNICATIONS SYSTEM

FIELD OF THE INVENTION

The invention relates to a method for controlling traffic in a telecommunications system, for controlling traffic in a telecommunications system.

BACKGROUND

The method according to the present invention avoids overloading the nodes or equipment of the network. In particular, the method is designed to control call traffic, but it can also be used in connection with other kind of traffic, e.g., to control data packets transmitted in a packet network. In the following, however, a telephone network where the traffic consists of calls made by the subscribers of the network is used as an example.

A so-called call gapping method (this name is used in several international standards, such as CCITT Blue Book, Recommendation E.412, §3.1.1.2, and Recommendation Q.542, §5.4.4.3) is a control method based on the rate of the traffic, and in this method the amount of traffic, e.g., number of calls, is restricted so that at most a certain number of calls per one time unit are allowed to pass through. This kind of method is described e.g. in U.S. Pat. No. 4,224,479, as well as in the standards mentioned above.

Equipment operating according to the call gapping method can be, e.g., a gapping gate 10 of the type shown in FIG. 1 in which the gate has one input, indicated by IN, and two outputs, indicated by PASS and GAP. A certain predetermined restriction parameter U, which corresponds to a certain number of calls per one time unit (e.g. calls per second), is stored in the gate. The incoming calls are conducted to the input IN of the gapping gate, and the accepted calls are forwarded from output PASS. The gapping gate restricts the frequency (rate of occurrence) of the calls so that the amount of accepted traffic per one time unit is at most the same as the above-mentioned restriction parameter U (calls per second). When the amount of incoming traffic per one time unit exceeds U, the gapping gate conducts some of the calls to output GAP so that the maximum rate of traffic outputted from gate PASS is U. Calls output from GAP can be processed further in many ways, but since the processing of these calls does not fall within the scope of the present application, it will not be described in greater detail herein.

In the aforesaid U.S. Pat. No. 4,224,479, a gapping gate operates such that the calls are given the shortest possible interval, e.g., 0.1 sec. between two consecutive calls. (The restriction parameter stored in the gate can also define the shortest accepted time interval I, which is called a gapping interval, between two consecutive calls. In principle, this is same thing, since the parameters concerned are inverse values of each other, i.e. $U=1/I$). The gapping gate stores the departure time of the last accepted call. If the difference between the arrival time of a new call and the stored departure time is smaller than the above shortest possible time interval, the call will be rejected. But if the difference is at least equivalent to the time interval, the call will be accepted and the departure time of the last accepted call will be updated such that it corresponds to the current time.

The operation of such a call gapping method is illustrated in FIG. 2. When the amount of traffic offered by the network (represented by the horizontal axis) is smaller than the above maximum U, no restriction takes place. When the amount of offered traffic exceeds this value, the gapping gate rejects some of the calls (conducting them to output GAP), whereby the amount of traffic forwarded (represented by the vertical axis) is U. The ideal situation is indicated by a dotted line and the actual situation by a continuous line. In practice, the characteristic curve (continuous line) describing the operation of the gapping gate is a smooth approximation of the partly linear characteristic curve (dotted line) of the ideal situation.

The drawback of the method described above is that because of the non-ideal restriction performed by the gapping gate, even a large number of calls that could be forwarded are rejected. This means that a gapping gate operating in accordance with the method is not able to produce a very good approximation of the situation indicated by a dotted line in FIG. 2, i.e., a situation where the gapping gate operates ideally. In actual simulations, it has been observed that when the amount of traffic reaches the allowed maximum U, the gapping gate can conduct up to about 40% of the calls to output GAP, although an ideally operating gapping gate should still be accepting all calls. From the point of view of the network operator, non-ideal operation of this kind means that the network operates at reduced capacity with respect to the resources and that no income is obtained for such a large percentage of calls.

That the gapping gate is not able to approximate an ideal situation any better than this is due to the fact that the traffic is not distributed evenly on the time axis but occurs in bursts in which momentary traffic density can be very high.

An object of the present invention is to overcome the above drawback by providing a new kind of control method that enables better approximation of an ideal gapping gate. This objective is achieved with the solutions of the invention.

SUMMARY OF THE INVENTION

Based on accepted calls only, a value that describes some kind of average between two consecutive accepted calls is calculated, and a decision about the acceptance of the call based on the result obtained is made.

The solution of the invention enables better approximation of an ideally operating gapping gate, whereby the amount of lost traffic and thereby lost income is smaller than before.

BRIEF DESCRIPTION OF THE DRAWINGS

In the following, the invention and its preferred embodiments will be described in greater detail with reference to the examples according to FIGS. 3 to 9 of the attached drawings, in which.

DETAILED DESCRIPTION OF THE PRESENTLY PREFERRED EMBODIMENTS

In the present invention, the average rate of the accepted traffic is to be restricted based on accepted calls such that it is always lower than constant U. In principle, there are two ways of doing this, depending on what information is stored in the gapping gate.

Figure 3:
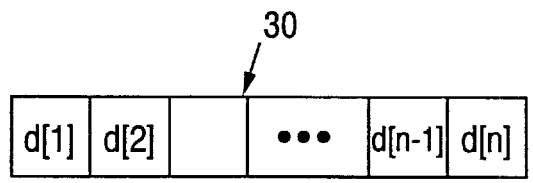
FIG. 3 shows an array of memory locations used in a first embodiment of the invention.

In a first embodiment of the invention, the times of the last n accepted calls are stored in the gapping gate. Constant n is an integer that is clearly bigger than 1, typically between 20 and 200. In the following, the array of times is indicated by d as follows: d[1] is the time of the last accepted call and d[n] is the time of the $n^{th}$ earlier accepted call (n=1, 2, ...). The gapping gate thus contains an array 30 of memory locations as shown in FIG. 3, the array having n memory locations, in which only times of accepted calls are stored. An array of memory locations is only an example. Instead of an array, e.g., a circular buffer memory could be used, and one or more pointers associated with it. The time used can be either the time when the call arrived at the input IN of the gapping gate (i.e. arrival time), or the time when the call was output from PASS (i.e., departure time).

Figure 4:
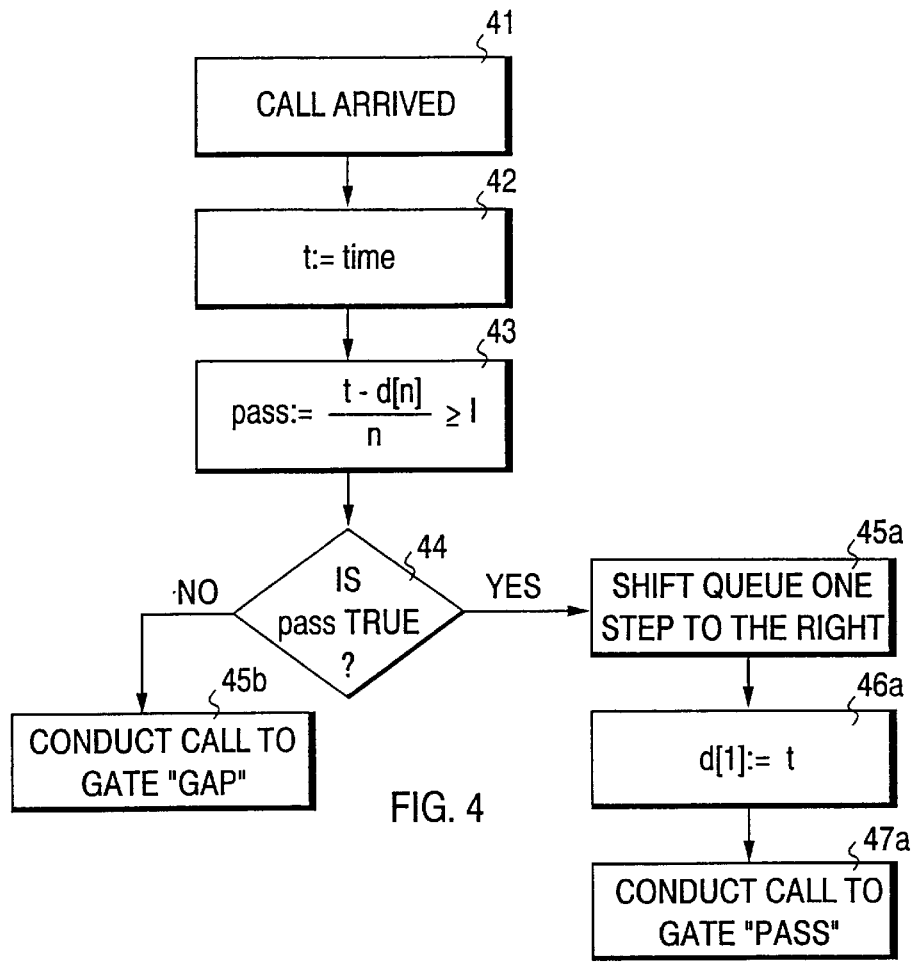
FIG. 4 is a flow diagram illustrating a first embodiment of the method according to the invention.

FIG. 4 is a flow diagram illustrating the first embodiment of the method according to the invention. When a new call arrives (step 41), the gapping gate stores the current time in variable t (step 42). After this, the gapping gate computes the average time interval between two consecutive calls during the last n accepted calls and compares the result with a predetermined threshold value I (step 43), which based on the above is an inverse value of the traffic density U to which the operator wants the traffic to be restricted. The result of the comparison (true or false) is stored as a value of the variable 'pass' (step 43). If in the next step (step 44) the average interval computed is found to be at least equal to the predetermined threshold value, the call will be accepted. The array 30 of memory locations is then shifted one step (one memory location) to the right (step 45a), whereby the most distant time is dropped and the last accepted time d[1] is given a value t (step 46a). The call is then conducted to gate PASS (step 47a). If the value of variable 'pass' is false, the call is conducted to gate GAP.

The gapping gate thus accepts the call if $$\frac{t - d(n)}{n} \geq I \qquad (1)$$

where I is the above-mentioned threshold value, which is called a gapping interval. (It should be noted that the denominator in formula (1) is n, since during n+1 calls, n time intervals between two consecutive calls are obtained.)

In the beginning, before the array 30 of memory locations is filled, d[n] is replaced with the time that is currently the most distant.

Figure 1:
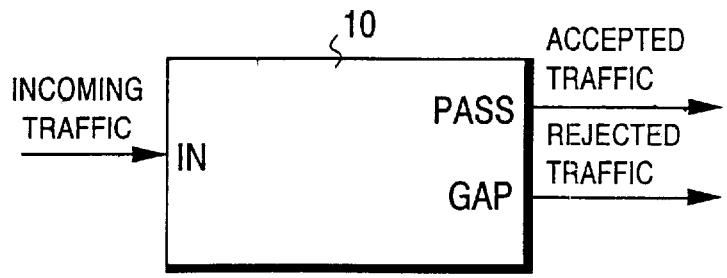
FIG. 1 shows a schematic view of a gate operating in accordance with a known gapping method.
Figure 2:
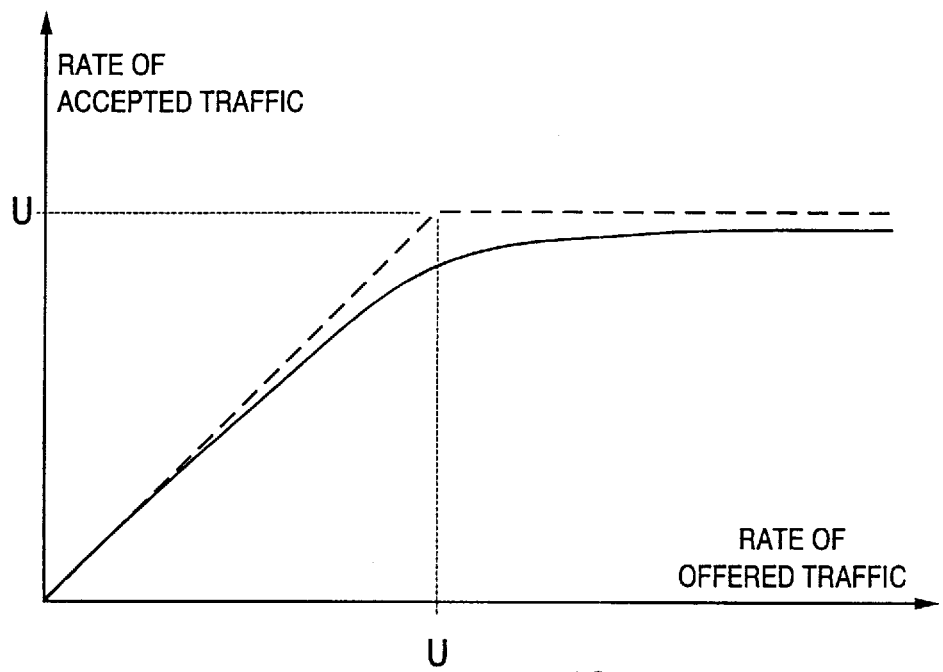
FIG. 2 illustrates the operation of the gate shown in FIG. 1.
Figure 5:
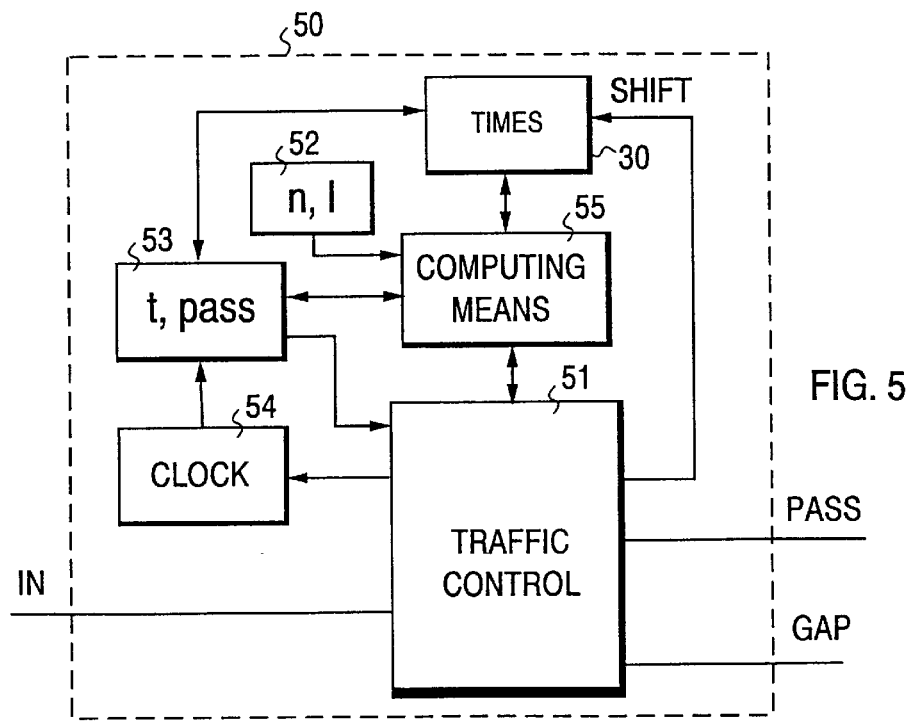
FIG. 5 is a block diagram showing a gapping gate according to the first embodiment of the invention.

FIG. 5 is a block diagram of a gapping gate 50, which operates in the manner described above. The core of the gapping gate consists of a traffic control unit 51, which comprises the input IN and outputs PASS and GAP, all of which have been mentioned above (cf. FIG. 1). The gapping gate also comprises the array of memory locations, as shown in FIG. 3, a memory 53 for variables t and 'pass', and a memory 52 for constants n and I. In addition to these memories, the gapping gate also comprises computing means 55 and a clock 54. When a new call arrives, the traffic control means instructs the clock 54 to store the current time in memory 53, after which it instructs the computing means 55 to compute the value of variable 'pass' and to store it in memory 53. The comparison of variable 'pass' is then conducted inside the traffic control unit 51. If the value of this variable is true, the traffic control unit gives memory 30 a command SHIFT, by which the array is shifted one step to the right and the value of variable t is stored in the memory 30. The traffic control unit then conducts the call to gate PASS. If the value of variable 'pass' is false, the traffic control unit forwards the call to gate GAP.

Figure 6:
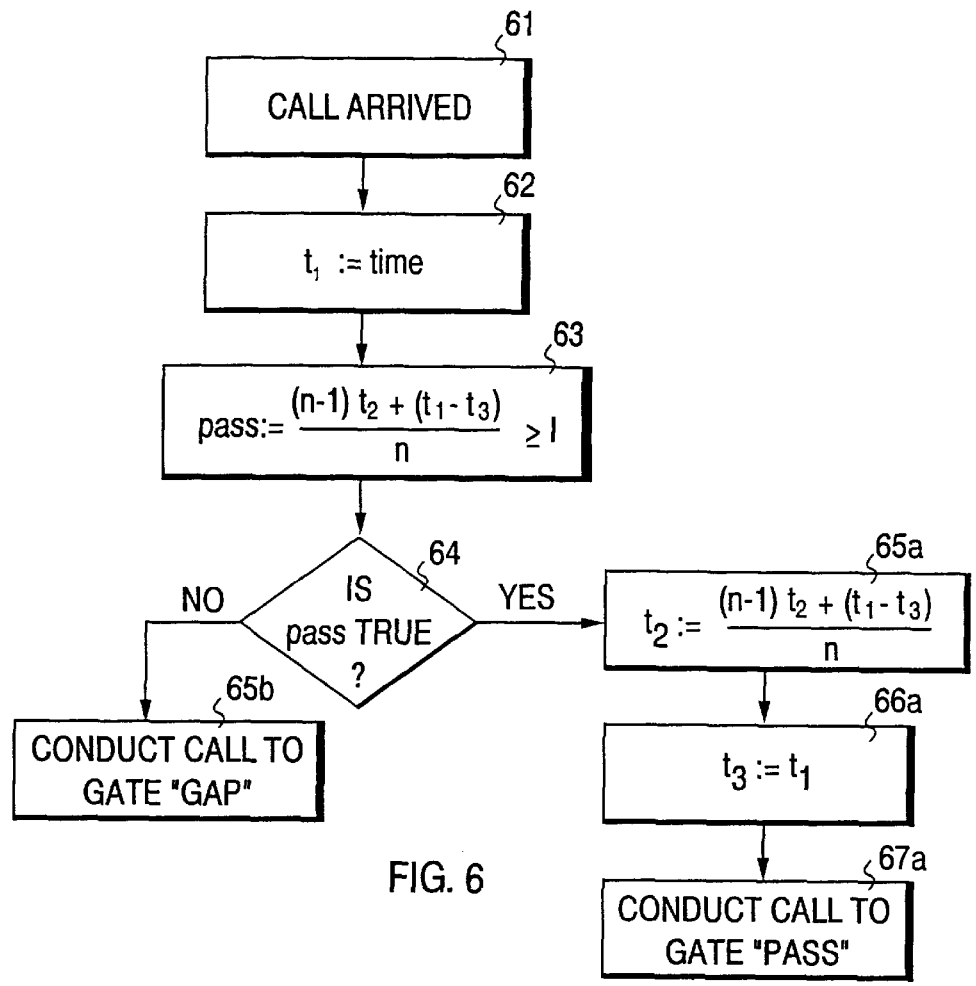
FIG. 6 is a flow diagram illustrating a second embodiment of the method according to the invention in its basic form.

In the above embodiment, the times of the last n accepted calls were stored in the gapping gate. In the second embodiment of the invention, additional variables $t_2$ and $t_3$ are introduced, in addition to the variables mentioned above. Variable $t_2$ represents an average between two consecutive calls, and variable $t_3$ represents the time of the last accepted call. Variable t discussed above is here indicated by $t_1$. The procedure is illustrated in FIG. 6, which the following text refers to.

At first, variable $t_2$ is given the value of gapping interval I (i.e., the value corresponding to the traffic density to which the operator wants the traffic to be restricted (i.e., I=1/U)). When an incoming call is detected (step 61), the gapping gate stores the current time in variable $t_1$ (step 62). After this, the gapping gate computes (step 63) a value (true or false) for variable 'pass', using the inequality $$\frac{(n-1)t_2 + (t_1 - t_3)}{n} \geq I. \qquad (2)$$

Variable $t_3$ is first given a value that corresponds to the current time minus the value of the gapping interval I. This guarantees that the first incoming call will be accepted. If it is found out in the next step (step 64) that the value of variable 'pass' is true, the call will be accepted, whereby the value of the left-hand side of the above inequality is stored as the value of $t_2$ (step 65a), and the value of variable $t_1$ is stored as the value of variable $t_3$ (step 66a). The mean value is thus updated so that it corresponds to the mean value computed in step 63 above, and the value of variable $t_3$ is updated so that it is correct. The call is then forwarded to gate PASS (step 67a). If the value of variable 'pass' is false, the call is forwarded to gate GAP (step 65b).

In other words, when an incoming call is detected at a moment $t_1$, the call is accepted if $$\frac{(n-1)t_2 + (t_1 - t_3)}{n} \geq I$$

is true.

The value of constant n can still be considered to determine how many of the earlier accepted calls will be taken into account, although it does not show the number of the times to be stored.

In inequality (2), term ($t_1-t_3$) is given weight (1/n), which corresponds to a situation where an average interval between two consecutive accepted calls is computed as regards the last n accepted calls (cf. formula (1)). The weight of term ($t_1-t_3$) can also be changed such that the weight of the last call is either decreased or increased as compared with the other calls. Inequality (2) can be written in general form $$at_2 + b(t_1-t_3) \geq I \qquad (3)$$

where a and b are suitably selected coefficients and a+b=1. (In the other formulae, a=(n−1)/n and b=1/n.)

Figure 7:
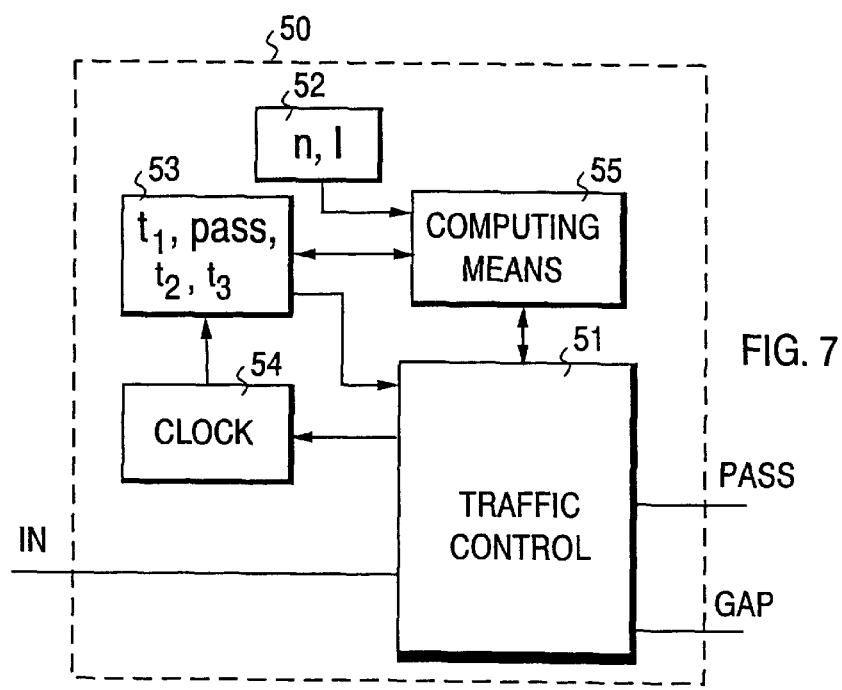
FIG. 7 is a block diagram showing a gapping gate according to a second embodiment of the invention.
Figure 8:
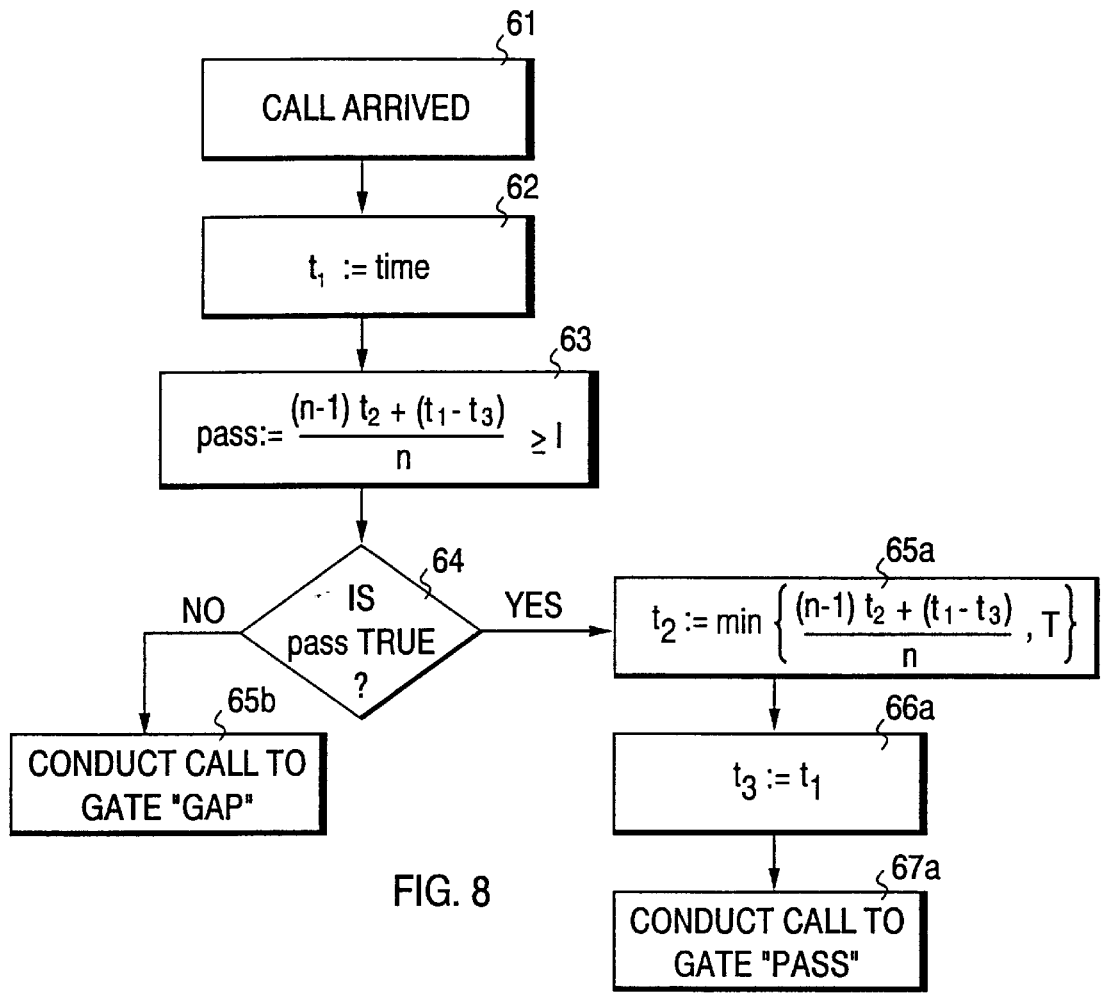
FIG. 8 is a flow diagram illustrating a preferred embodiment of the method illustrated in FIG. 6.
Figure 9:
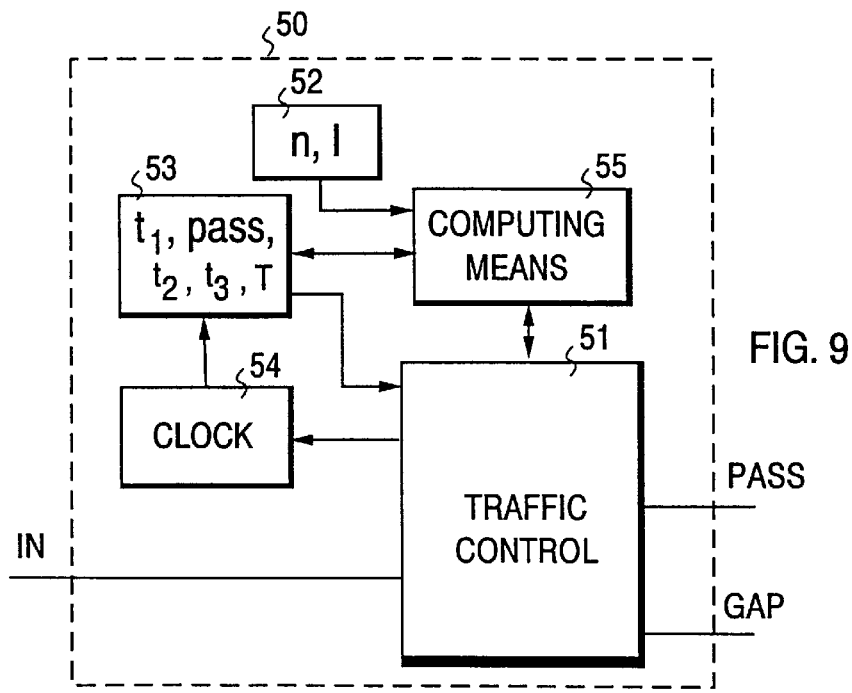
FIG. 9 shows a gapping gate implementing the method of FIG. 8.

The advantage of the above second embodiment over the above first embodiment is that times need not be stored for n earlier accepted calls, but it is sufficient that the values of the two additional variables ($t_2$ and $t_3$) are stored instead. The gapping gate of this embodiment is thus, in principle, identical to the gapping gate described in FIG. 5, except that it lacks memory 30 and that the values of variables $t_2$ and $t_3$ are also stored in the memory 53 for variables. A gapping gate like this is illustrated in FIG. 7, where the same elements are identified by the same reference numbers as in FIG. 5.

In order that in the mean value computed from inequality (2) (left-hand side of the inequality), several times could be taken into account, constant n should have a high value. On the other hand, if the calls arrive in bursts, the average value to be computed is only decreased by (n−1)/n per each call. Because of this, the value of parameter n should not be too high, either. When a long period with no incoming calls is followed by many calls arriving in a short time (traffic burst), a gapping gate operating in the manner described above lets all the calls belonging to the burst pass through. This kind of operation can be prevented by giving variable $t_2$ an upper limit that is greater than I and is indicated in the following by T.

The formula of variable $t_2$ is thus (4):

$$t_2 = \min\left\{ \frac{(n-1)t_2 + (t_1 - t_3)}{n}, T \right\} \quad (4)$$

By controlling the value of the upper limit T, the size of the largest acceptable burst can be defined to be as desired. In the following, the selection of the upper limit will be discussed in greater detail.

Let us assume that no calls have arrived in a very long time, and then a burst of calls arrives. The goal is then to set the value of the upper limit T such that the gapping gate will accept at most m calls of the burst. The first call of the burst is accepted, after which variable $t_2$ is given value T (which is the smaller one of the values according to equation (4), since the burst was preceded by a long period of time with no incoming calls).

Since we are dealing with a burst, it can be assumed that the difference between the arrival times of two consecutive calls (indicated by term $t_1$−$t_3$ in equation (4)) is zero. The value of variable $t_2$ after m calls is then:

$$t_2 = \left( \frac{n-1}{n} \right)^{m-1} T \quad (5)$$

The goal is achieved when $t_2 < I$, whereby, when ($t_2 = I$), equation (5) gives:

$$I = \left( \frac{n-1}{n} \right)^{m-1} T \quad (6)$$

and so the value of upper limit T is:

$$T = \left( \frac{n}{n-1} \right)^{m-1} I \quad (7)$$

Let us consider as an example a situation where the rate of occurrence of incoming calls is 10 calls per second and n=100. Therefore I=100 msec., and if we assume that the maximal allowable burst size is one hundred (i.e. m=100), the upper limit is T=270.5 msec. The value of variable $t_2$ is thus at most 270.5 msec.

In the first embodiment described above, the reference value was computed using the times of the accepted calls, which meant that the times of the last n accepted calls had to be stored. In the second embodiment described above, there is no such need. It suffices to store the additional variables mentioned above. The two embodiments can also be combined such that the value of $t_2$ is not updated after each call, but e.g., after every tenth call, whereby times of accepted calls are stored between the instances of updating. This saves computing capacity. Further, updating need not be performed at regular intervals, but it can be performed, e.g., such that when a call arrives, a random number is computed (it may be, e.g., a number between zero and one), and if the random number meets the predetermined criteria, updating will be performed.

The solution of the invention can also be applied to only part of the traffic, while the rest of the traffic is not restricted. For example, calls starting with a specified number/specified numbers can be restricted, while all the other calls are forwarded. In this case, there is a separate check gate before the gapping gate, the check gate conducting all the calls that meet the gapping criteria (number of the called subscriber starts, e.g., with 9800) to the gapping gate.

Although the invention is described above with reference to the examples illustrated in the attached drawings, it is to be understood that the invention is not limited thereto but can be modified within the scope of the inventive idea disclosed above and in the attached claims. Although above and in the claims, a call serves as an example for units transmitted in a network, the invention is to be understood as also covering other corresponding consecutive occurrences, e.g. control of data packet traffic in a data network.

We claim:

1. A method for controlling traffic in a telecommunications system, in which a rate of occurrence of units, such as calls, transmitted in the system is restricted to a certain predetermined threshold value when the rate of occurrence exceeds the value, the method comprising:

when a new call arrives, an average value of an interval between two consecutive calls is computed based on earlier accepted calls only; and a call is accepted, if the average value computed is at least equal to a predetermined value.

2. The method as claimed in claim 1, wherein times for a desired number of the last accepted calls are stored for the computation.

3. The method as claimed in claim 1, wherein a weighted average value of the interval between two consecutive calls computed based on several earlier accepted calls is stored for the computation, and wherein, when a new call arrives, a new average value is computed and then compared with said predetermined threshold value, and wherein, if the call is accepted, the stored average value is then replaced with the new computed average value.

4. The method as claimed in claim 3, wherein the new average value is computed every time a new call arrives.

5. The method as claimed in claim 3, wherein an upper limit equals the average value, the upper limit being stored as an average value every time the computed value exceeds the upper limit.

6. The method as claimed in claim 5, wherein the upper limit is given the value where m represents the number of calls that will be accepted in a burst of calls, I is the predetermined threshold value, and n is a constant integer used in computing the average value.

7. A gate arrangement for controlling traffic in a telecommunications system, the gate arrangement comprising:

selection means which restricts a rate of occurrence of units, such as calls, transmitted in the system by selecting those of the incoming calls that will be accepted for forwarding;

clock means which defines a time of occurrence of each call;

memory means which stores times of the last n accepted calls, n being greater than 1, preferably between 20 and 200; and computing means which computes an average value of an interval between two consecutive accepted calls based on the times stored.

8. A gate arrangement for controlling traffic in a telecommunications system, the gate arrangement comprising:

selection means which restricts a rate of occurrence of units, such as calls, transmitted in the system by selecting those of the incoming calls that will be accepted for forwarding;

clock means which defines a time of occurrence of each call;

memory means which stores a weighted average value an interval between two consecutive accepted calls computed based on earlier accepted call; and computing means which computes an average value of the interval between two consecutive accepted calls based on the time of occurrence of a new call, the stored average value, and a time of the last accepted call.

9. The gate arrangement as claimed in claim 7, an allowed upper limit of the computed average value is also stored in the memory means.

* * * * *

UNITED STATES PATENT AND TRADEMARK OFFICE
CERTIFICATE OF CORRECTION

PATENT NO.    : 5,881,137
DATED         : March 9, 1999
INVENTOR(S)   : Ginzboorg et al.

It is certified that error appears in the above-identified patent and that said Letters Patent is hereby corrected as shown below:

<u>INID Code [73] Assignee:</u>
Please change the Assignee's name from "Nokia Telecommunications" to -- Nokia Telecommunications Oy --.

Signed and Sealed this

Eighteenth Day of September, 2001

*Attest:*

NICHOLAS P. GODICI
*Attesting Officer*     *Acting Director of the United States Patent and Trademark Office*